United States Patent [19]

Naka et al.

[11] Patent Number: 5,302,673
[45] Date of Patent: Apr. 12, 1994

[54] POLY-HYDROXYNAPHTHALENE COMPOUNDS AND EPOXY RESIN COMPOSITION

[75] Inventors: Akihiro Naka; Shuichi Ito, both of Kyoto; Shinya Akizuki, Osaka; Kiyoshi Saito, Hyogo, all of Japan

[73] Assignees: Dai-Ichi Kogyo Seiyaku Co., Ltd., Kyoto; Nitto Denko Corporation, Osaka, both of Japan

[21] Appl. No.: 900,883

[22] Filed: Jun. 18, 1992

[30] Foreign Application Priority Data

Jun. 21, 1991 [JP] Japan .................. 3-150538
Nov. 11, 1991 [JP] Japan .................. 3-294437

[51] Int. Cl.$^5$ .................. C08G 8/12; C08L 61/08; C08L 63/02
[52] U.S. Cl. .................. 525/481; 525/485; 525/486; 528/97; 528/153
[58] Field of Search .................. 525/481, 485, 486; 528/97, 153

[56] References Cited

U.S. PATENT DOCUMENTS 4,424,315  1/1984  Taylor et al. .

FOREIGN PATENT DOCUMENTS 62-25116   2/1987  Japan .
62-167318  7/1987  Japan .
251419    10/1988  Japan .
163128     7/1991  Japan .

OTHER PUBLICATIONS

"J62025116", Abstract No. 87-070254/10, Derwent, Inc., McClean, Va. (1987).
Chemical Abstracts, vol. 102, Abstract No. 132607.
Chemical Abstracts, vol. 109, Abstract No. 55366.

Primary Examiner—John C. Bleutge
Assistant Examiner—D. R. Wilson
Attorney, Agent, or Firm—Jordan and Hamburg

[57] ABSTRACT

Copolycondensation of α-naphthol and β-naphthol with an aldehyde compound gives a poly-hydroxynaphthalene compound having an average molecular weight of 300 to 2,000. This compound is useful as a curing agent for epoxy resins and as a precursor of epoxy resins. Epoxy resin compositions include (1) compositions comprising an epoxy resin and the poly-hydroxynaphthalene compound as a curing agent and (2) compositions comprising an epoxy resin obtained by reacting the poly-hydroxynaphthalene compound with an epihalohydrin and a curing agent. The epoxy resin compositions of the invention are characterized in that the cured resins have a high glass transition temperature and high heat stability and high moisture resistance, scarcely allowing package cracking even in soldering treatment. Therefore the compositions are suited for use in encapsulating semiconductors.

2 Claims, No Drawings

5,302,673

POLY-HYDROXYNAPHTHALENE COMPOUNDS AND EPOXY RESIN COMPOSITION

BACKGROUND OF THE INVENTION

The present invention relates, in one aspect, to a poly-hydroxynaphthalene compound which is of value as an epoxy resin curing agent or an epoxy resin precursor, and in another aspect, to a highly dependable epoxy resin composition for use as a semiconductor encapsulant.

To protect semiconductor elements against the external environment, it is common practice to encapsulate them with an epoxy resin composition. This composition generally comprises an epoxy resin, a curing agent, a curing accelerator or promoter, a filler and several additives. The epoxy resin is an epoxidized version of a novolac resin which is obtainable by reacting a phenolic compound with formaldehyde and is typically an epoxidized o-cresol novolac. As the curing agent, phenol-formaldehyde novolac resin is typically employed. Further, as highly efficient curing agents, novolac resin obtained by reacting α-naphthol with aldehyde compounds, and epoxy resin derived from said novolac resin are known. But they have rather high softening points and fusion viscosities to be subjected to further processes such as molding, hence have not been put to practical use. On the other hand, it is known that β-naphthol which has poor reactivity to aldehyde compounds cannot be adopted.

The increasing density and size of semiconductor elements and the implementation of multi-pin flat packages in recent years are tending to reduce the amount of epoxy resin relative to the encapsulated semiconductor element. As a consequence, the semiconductor is more likely to be exposed to large stresses in the encapsulating operation. Moreover, as the surface-mounting method involves dipping of the encapsulated semiconductor in a molten solder bath, the semiconductor is not only subjected to intense thermal stresses but exposed to the adverse environment such that the water within the resin is rapidly vaporized to cause an expansion of resin volume.

When a large capacity semiconductor is encapsulated with the above epoxy resin, the problem of a cracked package may occur, causing deformation or corrosive breakage of the bonding wire and cracking of the passivation film of the element. Therefore, several high-performance epoxy resins have heretofore been proposed but none have overcome the problems.

It is an object of the present invention to provide a poly-hydroxynaphthalene compound which is of use as a curing agent for epoxy resin or an epoxy resin precursor and capable of providing a cured body which has a high glass transition temperature and improved heat and moisture resistance and is able to prevent cracking of a semiconductor package.

It is another object of the invention to provide a novel epoxy resin composition and an epoxy resin, which have a high glass transition temperature and improved heat and moisture resistance and are adapted to prevent cracking of a semiconductor package.

It is still another object of the invention to provide an epoxy resin composition and an epoxy resin, which are of use as a semiconductor encapsulant.

SUMMARY OF THE INVENTION

As a result of intensive investigations made by the present inventors in an attempt to accomplish the above objects, it was found (1) that while the reaction of β-naphthol alone with aldehyde compounds will not progress smoothly, the combined use of a α-naphthol and β-naphthol enables the copolycondensation reaction thereof with aldehyde compounds to progress smoothly, (2) that the copolycondensates obtained have a low softening point and fusion viscosity and is readily further processed, and the cured product has a high glass transition point and is excellent in heat stability and moisture resistance and (3) that said copolycondensates are useful not only as curing agents for epoxy resins but also as precursors to epoxy resins. The present invention has been completed based on these findings.

The invention thus provides a poly-hydroxynaphthalene compound which is obtained by copolycondensation of α-naphthol and β-naphthol with an aldehyde compound and can serve as a curing agent for epoxy resins or as a precursor of epoxy resins.

The poly-hydroxynaphthalene compound preferably has a weight-average molecular weight (hereinafter referred to as "average molecular weight" or "molecular weight") of 300 to 2,000 and, more preferably, is a copolycondensate of 70 to 30 mole percent of the α-naphthol unit and 30 to 70 mole percent of the β-naphthol unit with an aldehyde, having an average molecular weight of 300 to 1,500, and a hydroxyl equivalent of 100 to 500, preferably, 110 to 300.

Weight-average molecular weights are measured with a gel permeation chromatography (GPC) employing polystyrenes of known molecular weights.

| | |
|---|---|
| Solvent: | tetrahydrofuran |
| Flow rate: | 0.8 ml/min |
| Column: | G4000H, G3000H and G2000H in series, having exclusion limits of molecular weights of which are 400,000, 60,000 and 10,000 respectively |
| Carrier: | styrene-divinylbenzene copolymer |
| Manufacturer: | Toyo soda Mfg. Co., Ltd. |

The invention also provides an epoxy resin composition which comprises an epoxy resin, the poly-hydroxynaphthalene compound as a curing agent.

The invention further provides a polyfunctional epoxy resin derived from the above poly-hydroxynaphthalene compound and an epihalohydrin and, still further, an epoxy resin composition which comprises said poly-functional epoxy resin, and a curing agent.

An epoxy resin composition of the invention which contains a poly-hydroxynaphthalene compound as a curing agent and an epoxy resin composition of the invention which contains the poly-hydroxynaphthalene compound-derived epoxy resins preferably comprise a curing promoter. In that case, the compositions are especially useful as semiconductor encapsulants.

Unless otherwise specified, the term "epoxy resin" as used herein means a resinous epoxy compound as well as a low-molecular-weight epoxy compound.

The principal feature of the invention consists in that the poly-hydroxynaphthalene compound is a copolycondensate of α-naphthol and β-naphthol with an aldehyde compound. β-Naphthol can hardly condense with aldehyde compounds, failing to give resinous compounds. On the contrary, when β-naphthol is reacted with aldehyde compounds in the presence of α-naphthol, the copolycondensation reaction progresses smoothly and gives poly-hydroxynaphthalene compounds.

In the poly-hydroxynaphthalene compound according to the first aspect of the invention, the ratio between α-naphthol and β-naphthol can be selected within such an appropriate range as to give copolycondensates. Preferably, the α-naphthol:β-naphthol ratio is 85 to 15:15 to 85 (mole percent), more preferably 70 to 30:30 to 70 (mole percent). The use of α-naphthol in amounts exceeding the upper limit of the range mentioned above will result in a high softening point and fusion viscosity, which causes the difficulty of further processes, and somewhat inferior heat stability of the cured product, while an excessive amount of β-naphthol makes it difficult for the copolycondensation reaction with α-naphthol to proceed, readily causing a decrease in heat stability.

As the aldehyde compound, there may be mentioned, for example, aliphatic aldehydes such as formaldehyde, acetaldehyde, propionaldehyde and butylaldehyde, aromatic aldehydes such as benzaldehyde, p-hydroxybenzaldehyde and salicylaldehyde, and polyvalent aldehydes such as glyoxal and terephthalaldehyde. Among these compounds, formaldehyde, benzaldehyde, p-hydroxybenzaldehyde, salicylaldehyde, glyoxal and terephthalaldehyde are preferred. These aldehyde compounds with weight-average molecular weight of, preferably, not more than 300 may be used either alone or in combination.

The aldehyde compound is charged generally in an amount of 0.3 to 0.9 mole, preferably 0.4 to 0.8 mole, per mole of α-naphthol plus β-naphthol although the amount of the aldehyde compound may vary depending on the number of formyl groups occurring in each molecule thereof. When the aldehyde is charged in a smaller amount, the copolycondensate will have a smaller molecular weight, hence give epoxy resin compositions with lower heat stability of the cured product. Conversely, when the aldehyde is charged in an excessively large amount, an excessively high molecular weight, hence an excessively high softening point and fusion viscosity, will be obtained, raising a moldability problem. It is possible, however, to use the aldehyde compound in excess in carrying out the reaction and remove part of the aldehyde compound in the course of the reaction.

The copolycondensate has an average molecular weight of 300 to 2,000, preferably 300 to 1,500.

The copolycondensation reaction can be carried out in the conventional manner, for example using an acid or basic catalyst. The reaction may be conducted in the manner of two-step process, for instance, where a basic catalyst is first added to the reaction system and then an acid catalyst is added to said system. Generally, however, the copolycondensation reaction is carried out in the presence of an acid catalyst.

As examples of the acid catalyst, there may be mentioned mineral acids such as sulfuric acid, hydrochloric acid, nitric acid and hydrobromic acid, sulfonic acids such as p-toluenesulfonic acid and benzenesulfonic acid, and organic acids such as oxalic acid, succinic acid and malonic acid. It is also possible to effect the reaction by heating at an elevated temperature without using any catalyst.

The reaction may be carried out in the absence or presence of a solvent. The solvent may be any of various organic solvents inert to the reaction, for example aromatic hydrocarbons such as benzene and toluene, halogenated hydrocarbons such as chlorobenzene and dichlorobenzene, ketones such as methyl ethyl ketone and methyl isobutyl ketone, ethers such as tetrahydrofuran, aprotic polar solvents such as dimethyl sulfoxide and dimethylformamide, and mixed solvents composed of two or more of these.

The reaction temperature can suitably be selected depending on the reactants and is, for example, about 50° to 200° C. For the preferred aliphatic aldehydes, the reaction temperature is about 60° to 150° C. and, for aromatic aldehydes, the reaction temperature is about 60° to 190° C. Generally, the reaction will be complete in about 1 to 10 hours.

After completion of the reaction, the insoluble matter may be removed by washing with water, for instance, or the unreacted monomers may be removed by washing with a solvent or degasification treatment under reduced pressure, when necessary.

The poly-hydroxynaphthalene compound obtained in the above manner is useful as a curing agent for epoxy resins and as a precursor of epoxy resins.

The epoxy resin composition according to the second aspect of the invention comprises an epoxy resin and the above-mentioned poly-hydroxynaphthalene compound which functions as a curing agent.

The composition preferably also comprises a curing promoter, and in that case, is especially useful as semiconductor encapsulants.

In using the poly-hydroxynaphthalene compound as a curing agent for epoxy resins, it may be used either alone or combinedly with some other curing agent comprising a compound having at least two, preferably three or more phenolic hydroxyl groups per molecule. As such other curing agent, there may be mentioned, for example, conventional phenol resins produced by reacting phenol or a substituted phenol (e.g. o-cresol, p-cresol, tert-butylphenol, cumylphenol, phenylphenol) with an aldehyde compound in the presence of an acid or basic catalyst, reaction products from resorcinol and an aldehyde compound, and polyvinylphenol. Said other curing agent is used in an amount of not more than 70% by weight, preferably not more than 50% by weight, based on the whole curing agent.

The epoxy resin is not limited to any particular species but may be any of conventional epoxy resins, for example, of the bisphenol A type, phenol novolak type, and cresol novolak type. Among these resins, those having a melting point above room temperature and occurring as solids or highly viscous solutions at room temperature are preferred.

As the bisphenol A type epoxy resins mentioned above, those having an epoxy equivalent of 160 to 200 and a softening point of 50° to 130° C. are generally used. As the phenol novolak type epoxy resins, those having an epoxy equivalent of 180 to 210 and a softening point of 50° to 130° C. are generally used and, as the cresol novolak type epoxy resins, those having an epoxy equivalent of 180 to 210 and a softening point of 60° to 110° C. are generally used.

The proportions of the epoxy resin and curing agent are generally such that the equivalent ratio between the epoxy groups of the epoxy resin and the phenolic hydroxyl groups of the curing agent (epoxy groups/phenolic hydroxyl groups) is within the range of 1/0.8 to 1.2, preferably 1/0.9 to 1.1. When the epoxy resin and curing agent are used in such proportions, the cured products will have good heat stability and moisture resistance.

The curing promoter is not limited to any particular species but may be any of conventional catalysts. Specific examples of the curing promoter are phosphorus compounds such as triphenylphosphine, tris-2,6-dimethoxyphenylphosphine, tri-p-tolylphosphine and triphenyl phosphite, imidazoles such as 2-methylimidazole, 2-phenylimidazole, 2-undecylimidazole, 2-heptadecylimidazole and 2-ethyl-4-methylimidazole, tertiary amines such as 2-dimethylaminomethylphenol, benzyldimethylamine and α-methylbenzyldimethylamine, and such organic bases as 1,5-diazabicyclo[4.3.0]-5nonene, 1,4-diazabicyclo[2.2.-2]octane and 1,8-diazabicyclo[5.4.0]-7-undecene.

From the heat stability and moisture resistance viewpoint, the curing promoter is preferably used, for instance, at an addition level of 0.1 to 3.0% by weight based on the whole epoxy resin composition basis.

The poly-hydroxynaphthalene compound mentioned above is useful also as a precursor of epoxy resins.

The epoxy resin according to the third aspect of the invention can be produced by reacting the above-mentioned poly-hydroxynaphthalene compound with an epihalohydrin.

The epihalohydrin is, for example, epichlorohydrin, epibromohydrin, β-methylepichlorohydrin, β-methylepibromohydrin or β-methylepiiodohydrin. Epichlorohydrin is among preferred epihalohydrins.

The reaction of the poly-hydroxynaphthalene compound with the epihalohydrin can be carried out in the conventional manner, for example by either of the following two typical processes.

1) One-step process which comprises reacting the poly-hydroxynaphthalene compound with the epihalohydrin used in excess in the presence of an alkali metal hydroxide to thereby effect the addition and epoxy ring-forming ring closure reactions simultaneously;

2) Two-step process which comprises subjecting the poly-hydroxynaphthalene compound and the epihalohydrin used in excess to addition reaction in the presence of a basic catalyst and then adding an alkali metal hydroxide to thereby effect ring closure.

In the above one-step and two-step processes, the epihalohydrin is used generally in an amount of 1.3 to 20 mole equivalents, preferably 2 to 10 mole equivalents, per hydroxyl equivalent of the poly-hydroxynaphthalene compound. After reaction, the excess epihalohydrin can be recovered for recycling.

In the above-mentioned one-step and two-step processes, sodium hydroxide or potassium hydroxide can be used as the alkali metal hydroxide. The alkali metal hydroxide to be added to the reaction system may be in the form of a solid or in the form of an aqueous solution having a concentration of about 40 to 50% by weight. The amount of the alkali metal hydroxide is about 0.8 to 1.5 mole equivalents, preferably about 0.9 to 1.1 mole equivalents, per hydroxyl equivalent of the poly-hydroxynaphthalene compound.

In the one-step process mentioned above, the reaction can be performed at a temperature of, for example, 50° to 150° C., preferably 80° to 120° C.

The basic catalyst to be used in the above two-step process includes, among others, quaternary ammonium salts such as tetramethylammonium chloride, tetramethylammonium bromide, tetraethylammonium chloride, tetraethylammonium bromide, tetrabutylammonium chloride, tetrabutylammonium bromide, triethylmethylammonium chloride, trimethylbenzylammonium chloride and triethylbenzylammonium chloride.

The basic catalyst may be used in an amount of 0.002 to 3.0 mole percent relative to the hydroxyl group of the poly-hydroxynaphthalene compound.

In the above-mentioned two-step process, the first-step reaction can be carried out at a temperature of, for example, 60° to 150° C., preferably 100° to 140° C.

The second-step reaction can be conducted at 20° to 150° C., preferably 60° to 120° C. The amount of the alkali metal hydroxide to be used in said second-step reaction is about 1 to 1.1 moles per mole of the halohydrin formed.

These reactions may be conducted in the absence of any solvent or in the presence of a solvent inert to the reactions. Examples of the solvent are ketones such as methyl ethyl ketone and methyl isobutyl ketone, alicyclic hydrocarbons such as cyclohexane, and aromatic hydrocarbons such as toluene, among others.

After completion of the reaction process, the polyfunctional epoxy resin of the present invention can be obtained by removing the above-mentioned catalyst and other unnecessary components by washing with water or a solvent and deaeration under reduced pressure, for instance.

The polyfunctional epoxy resin of the invention is viscous or solid at room temperature and has a weight-average molecular weight of about 300 to 5000, preferably about 400 to 2000. It has an epoxy equivalent of about 130 to 1000, preferably about 150 to 500.

Cured products of the polyfunctional epoxy resin of the invention have a high glass transition point and are excellent in heat stability and moisture resistance. Furthermore, it gives high strength at solder reflow temperatures and has a low absorbability of moisture, and thus prevents cracking of packages. Therefore, the polyfunctional epoxy resin derived from the above-mentioned poly-hydroxynaphthalene compound is useful as a material of epoxy resin compositions for encapsulating semiconductors.

The epoxy resin composition according to the fourth aspect of the invention comprises the polyfunctional epoxy resin derived from the afore-mentioned poly-hydroxynaphthalene compound, and a curing agent. The composition preferably also comprises a curing promoter, and in that case, is especially useful as semiconductor encapsulants.

The polyfunctional epoxy resin may be used either alone or in combination with one or more other epoxy resins, for example of the phenol novolak type, cresol novolak type or bisphenol A type. The other epoxy resins may be used in an amount of not more than 70% by weight, preferably not more than 50% by weight, on the whole epoxy resin basis.

The curing agent mentioned above may be a compound having at least two, preferably three or more, phenolic hydroxyl groups per molecule. Specific examples include the poly-hydroxynaphthalene compounds mentioned above and other curing agents such as those phenol resins mentioned above as combinedly usable in the epoxy resin composition according to the second aspect of the invention. The curing agent is used in the same proportion as in the epoxy resin composition according to the second aspect of the invention.

The curing promoter or accelerator to be used in this aspect of the invention includes, in the same manner as mentioned above, phosphorus compounds, imidazoles, tertiary amines, organic bases, and so on. The amount of the curing promoter is the same as in the above-mentioned second aspect of the invention.

The epoxy resin compositions of the present invention each may contain one or more additives as required. Said additives include, among others, fillers, surface modifiers for the treatment of filler surfaces, fire retardants, mold release agents, colorants, and flexibilizers.

The fillers are not limited to any particular kind but include powdered crystalline silica, powdered fused silica, powdered quartz glass, talc, powdered calcium silicate, powdered zirconium silicate, powdered alumina, and powdered calcium carbonate, among others. Among these fillers, silica-based fillers are preferred. The filler addition level is 60 to 90% by weight, preferably 70 to 85% by weight, on the whole composition basis. At addition levels above 90% by weight, the compositions show insufficient flowability, hence can hardly be molded. At addition levels below 60% by weight, the coefficient of thermal expansion tends to increase.

The surface modifiers include silane coupling agents known in the art, and fire retardants include antimony trioxide, antimony pentoxide, phosphates and bromides. The mold release agents include various waxes, and the colorants include carbon black and so forth. The flexibilizers include, among others, silicone resins and butadiene-acrylonitrile rubbers.

The method of preparing the epoxy resin compositions of the present invention is not limited to any particular one but may be any of the conventional methods. The conditions in encapsulating semiconductors using the resin compositions of the present invention are not particularly limited to any specific ones but may suitably be selected. In a specific example, the encapsulating conditions are as follows: 175° C., molding pressure 100 kg/cm$^2$, 3 minutes; 180° C.×5 hours for postcuring. A transfer molding is usually adopted.

DETAILED DESCRIPTION OF PREFERRED EMBODIMENTS

The following examples are further illustrative of typical embodiments of the present invention but are by no means limitative of the scope of the invention.

EXAMPLE 1

Poly-hydroxynaphthalene compound 1

A reaction vessel equipped with a stirrer, reflux condenser, thermometer and nitrogen inlet was charged with 96 g of α-naphthol, 48 g of β-naphthol, 23 g of paraformaldehyde and 0.2 g of oxalic acid and the charge was heated at 110° C. for 8 hours with stirring in a nitrogen atmosphere. Thereafter, the reaction mixture was heated at 200° C. under reduced pressure (5 mmHg) to eliminate unreacted materials and water. The copolycondensate obtained had an average molecular weight of 690. It had a low viscosity and was easily processed further. In the examples provided hereinafter, the viscosity was measured always at 150° C.

Hydroxyl equivalent: 158; softening point: 99° C.;
viscosity (150° C.): 4.7 poise (hereinafter referred to as "P").

EXAMPLE 2

Poly-hydroxynaphthalene compound 2

A poly-hydroxynaphthalene compound was produced in the same manner as in Example 1 except that α-naphthol, β-naphthol and paraformaldehyde were used in amounts of 72 g, 72 g and 21 g, respectively. The copolycondensate obtained had an average molecular weight of 500.

Hydroxyl equivalent: 157; softening point: 85° C.;
viscosity: 2.8P.

EXAMPLE 3

Poly-hydroxynaphthalene compound 3

A poly-hydroxynaphthalene compound was produced in the same manner as in Example 1 except that α-naphthol, β-naphthol and paraformaldehyde were used in amounts of 48 g, 96 g and 27 g, respectively. The copolycondensate obtained had an average molecular weight of 910.

Hydroxyl equivalent: 161; softening point: 108° C.;
viscosity: 7.6P.

EXAMPLE 4

Poly-hydroxynaphthalene compound 4

A poly-hydroxynaphthalene compound was produced in the same manner as in Example 1 except that 70 g of benzaldehyde was used in lieu of paraformaldehyde, and p-toluenesulfonic acid in lieu of oxalic acid. The copolycondensate obtained had an average molecular weight of 630.

Hydroxyl equivalent: 204; softening point: 91° C.;
viscosity: 3.2P.

EXAMPLE 5

Poly-hydroxynaphthalene compound 5

A poly-hydroxynaphthalene compound was produced in the same manner as in Example 1 except that 78 g of p-hydroxybenzaldehyde was used in lieu of paraformaldehyde and the reaction was conducted at 180° C. The copolycondensate obtained had an average molecular weight of 680.

Hydroxyl equivalent: 125; softening point: 109° C.;
viscosity: 6.8P.

EXAMPLE 6

Poly-hydroxynaphthalene compound 6

A poly-hydroxynaphthalene compound was produced in the same manner as in Example 1 except that 78 g of salicylaldehyde was used in lieu of paraformaldehyde and the reaction was conducted at 180° C. The copolycondensate obtained had an average molecular weight of 670.

Hydroxyl equivalent: 127; softening point: 108° C.;
viscosity: 7.6 P.

EXAMPLE 7

Poly-hydroxynaphthalene compound 7

A poly-hydroxynaphthalene compound was produced in the same manner as in Example 1 except that 57 g of terephthalaldehyde was used in lieu of paraformaldehyde. The copolycondensate obtained had an average molecular weight of 880.

Hydroxyl equivalent: 175; softening point: 104° C.;
viscosity: 6.8 P.

EXAMPLES 8 THROUGH 14 AND COMPARATIVE EXAMPLE 1

Epoxy resin compositions for encapsulating semiconductors were prepared by kneading, in a two-roll mill at a temperature of 70°-110° C., mixtures of the epoxy resins, curing agent, curing promoter and filler, each specified below, antimony trioxide, a silane coupling agent, wax and carbon black, as formulated according to the recipes shown in Table 1, then cooling the resulting compositions and grinding the same.

| | |
|---|---|
| Epoxy resins: | o-Cresol novolak-based epoxy resin (epoxy equivalent: 195; softening point: 85° C.) Brominated phenolic novolak-based epoxy resin (epoxy equivalent: 280; softening point: 83° C.) |
| Curing agent: | The poly-hydroxynaphthalene compound obtained in each of Examples 1 to 7, or Phenolic novolak resin; (hydroxyl equivalent: 106; softening point: 80° C.) |
| Curing promoter: | Triphenylphosphine. |
| Filler: | Spherical silica; BF 100, Mitsubishi Metal Corporation. |

The compositions obtained were molded under the following curing conditions: 175° C., 100 kg/cm$^2$, 3 minutes. The moldings were subjected to postcuring under the conditions of 180° C.×6 hours to give molded test specimens. Each package was a 80-pin quadridirectional flat package (80-pin QFP, 20×14×2 mm in size) and the die pad size was 8×8 mm.

The thus-obtained semiconductor devices were each subjected to a TCT test (−50° C./5 minutes to 150° C./5 minutes) and the number of cracks was recorded. In a further crack resistance test, the test specimens mentioned above were allowed to stand in a constant-temperature bath maintained at 85° C. and 85% RH for moisture absorption and then immersed in a molten solder bath at 260° C. for 10 seconds. The results obtained are shown below in Table 2.

The test specimens obtained were tested for bending strength at 200° C. (high-temperature strength), glass transition temperature, thermal expansion coefficient, and moisture absorption after 500 hours of conditioning at 85° C. and 85% RH. The results obtained are shown below in Table 3.

TABLE 1

| | Example | | | | | | | Comparative Example |
|---|---|---|---|---|---|---|---|---|
| | 8 | 9 | 10 | 11 | 12 | 13 | 14 | 1 |
| o-Cresol novolak-based epoxy resin | 100 | 100 | 100 | 100 | 100 | 100 | 100 | 100 |
| Brominated phenolic novolak-based epoxy resin | 10 | 10 | 10 | 10 | 10 | 10 | 10 | 10 |
| Example 1 | 78 | — | — | — | — | — | — | — |
| Example 2 | — | 80 | — | — | — | — | — | — |
| Example 3 | — | — | 75 | — | — | — | — | — |
| Example 4 | — | — | — | 104 | — | — | — | — |
| Example 5 | — | — | — | — | 57 | — | — | — |
| Example 6 | — | — | — | — | — | 60 | — | — |
| Example 7 | — | — | — | — | — | — | 90 | — |
| Phenolic novolak resin | — | — | — | — | — | — | — | 59 |
| Triphenylphosphine | 5 | 5 | 5 | 5 | 5 | 5 | 5 | 5 |
| BF-100 | 690 | 697 | 681 | 773 | 624 | 633 | 728 | 630 |
| Antimony trioxide | 10 | 10 | 10 | 10 | 10 | 10 | 10 | 10 |
| Silane coupling agent | 8 | 8 | 8 | 8 | 8 | 8 | 8 | 8 |
| Wax | 2 | 2 | 2 | 2 | 2 | 2 | 2 | 2 |
| Carbon black | 5 | 5 | 5 | 5 | 5 | 5 | 5 | 5 |

TABLE 2

| | | | Example | | | | | | | Comparative Example |
|---|---|---|---|---|---|---|---|---|---|---|---|
| | | | 8 | 9 | 10 | 11 | 12 | 13 | 14 | 1 |
| Number of cracks found in TCT test (cracks/5 specimens) | Number of cycles | 1000 | 0/5 | 0/5 | 0/5 | 0/5 | 0/5 | 0/5 | 0/5 | 5/5 |
| | | 2000 | 0/5 | 0/5 | 0/5 | 0/5 | 0/5 | 0/5 | 0/5 | 5/5 |
| | | 3000 | 0/5 | 0/5 | 0/5 | 0/5 | 0/5 | 0/5 | 0/5 | 5/5 |
| Number of cracks found in crack resistance test comprising immersion in molten solder (Cracks/5 specimens) | Period of treatment for moisture absorption at 85° C./85% RH | 48 Hrs | 1/5 | 0/5 | 0/5 | 0/5 | 0/5 | 0/5 | 1/5 | 5/5 |
| | | 72 Hrs | 2/5 | 0/5 | 1/5 | 0/5 | 0/5 | 1/5 | 2/5 | 5/5 |
| | | 96 Hrs | 3/5 | 1/5 | 2/5 | 1/5 | 1/5 | 2/5 | 3/5 | 5/5 |

TABLE 3

| | Example | | | | | | | Comparative Example |
|---|---|---|---|---|---|---|---|---|
| | 8 | 9 | 10 | 11 | 12 | 13 | 14 | 1 |
| Bending strength (kg/cm$^2$, 200° C.) | 4.5 | 4.6 | 4.5 | 6.0 | 6.5 | 6.5 | 6.8 | 1.1 |
| Glass transition temperature (°C.) | 210 | 220 | 210 | 250 | 270 | 270 | 260 | 164 |
| Thermal expansion coefficient (10$^{-5}$/°C.) | 1.5 | 1.5 | 1.5 | 1.5 | 1.4 | 1.4 | 1.5 | 1.6 |
| Water absorption (%) | 2.4 | 2.5 | 2.4 | 2.3 | 2.9 | 2.9 | 2.3 | 3.9 |

EXAMPLE 15

Epoxy resin 1

The whole amount of the poly-hydroxynaphthalene compound prepared by following the procedure of Example 1, 1,500 g of epichlorohydrin and 2 g of tetrabutylammonium bromide were heated in a reaction vessel under reflux for 3 hours. The excess epichlorohydrin was removed under reduced pressure. An equal volume (relative to the reaction vessel contents) of toluene was added, the resultant mixture was cooled to 60° C., a water removing device was mounted on the reaction vessel, 40 g of caustic soda was added, and the ring closure reaction was allowed to proceed while the byproduct water was continuously removed under reduced pressure (100 to 150 mmHg). The salts and unreacted alkali were removed by washing with water, and the toluene and water and other volatiles were removed under reduced pressure to give an epoxy resin. It had a low viscosity and was easy for further processing.

Molecular weight: 1230; epoxy equivalent: 218; softening point: 85° C.; viscosity: 3.2 P.

EXAMPLE 16

Epoxy resin 2

An epoxy resin was produced in the same manner as in Example 15 except that the whole amount of the poly-hydroxynaphthalene compound prepared by following the procedure of Example 2 was used.

Molecular weight: 880; epoxy equivalent: 216; softening point: 82° C.; viscosity: 1.8 P.

EXAMPLE 17

Epoxy resin 3

An epoxy resin was produced in the same manner as in Example 15 except that the whole amount of the poly-hydroxynaphthalene compound prepared by following the procedure of Example 3 was used.

Molecular weight: 1430; epoxy equivalent: 220; softening point: 98° C.; viscosity: 3.9 P.

EXAMPLE 18

Epoxy resin 4

An epoxy resin was produced in the same manner as in Example 15 employing the whole amount of the polyhydroxynaphthalene compound prepared by following the procedure of Example 16 except that 90 g of benzaldehyde was used in lieu of paraformaldehyde, and p-toluenesulfonic acid in lieu of oxalic acid.

Molecular weight: 1020; epoxy equivalent: 283; softening point: 87° C.; viscosity: 1.9 P.

EXAMPLE 19

Epoxy resin 5

An epoxy resin was produced in the same manner as in Example 15 employing the whole amount of the polyhydroxynaphthalane compound prepared by following the procedure of Example 16 except that 98 g of p-hydroxybenzaldehyde was used in lieu of paraformaldehyde, and p-toluenesulfonic acid in lieu of oxalic acid, and the reaction was carried out at 180° C.

Molecular weight: 1120; epoxy equivalent: 187; softening point: 99° C.; viscosity: 4.0 P.

EXAMPLE 20

Epoxy resin 6

An epoxy resin was produced in the same manner as in Example 15 employing the whole amount of the polyhydroxynaphthalene compound prepared by following the procedure of Example 16 except that 98 g of salicylaldehyde was used in lieu of paraformaldehyde, and p-toluenesulfonic acid in lieu of oxalic acid, and the reaction was conducted at 180° C.

Molecular weight: 1110; epoxy equivalent: 188; softening point: 92° C.; viscosity: 3.5 P.

EXAMPLE 21

Epoxy resin 7

An epoxy resin was produced in the same manner as in Example 15 employing the whole amount of the polyhydroxynaphthalene compound prepared by following the procedure of Example 16 except that 57 g of terephthalaldehyde was used in lieu of paraformaldehyde, and p-toluenesulfonic acid in lieu of oxalic acid.

Molecular weight: 1330; epoxy equivalent: 251; softening point: 98° C.; viscosity: 3.6 P.

EXAMPLES 22 THROUGH 28 AND COMPARATIVE EXAMPLE 2

Epoxy resin compositions for encapsulating semiconductors were prepared by kneading, in a two-roll mill at a temperature of 70° to 110° C., the mixtures composed of the epoxy resin or resins, curing agent, curing promoter and filler each specified below, antimony trioxide, a silane coupling agent, wax and carbon black in the respective proportions shown below in Table 4, then cooling the mixtures and grinding the same.

| Epoxy resins: | Each of the epoxy resins 1 to 7 obtained in Examples 15 to 21, respectively; o-Cresol novolak epoxy resin (epoxy equivalent: 195; softening point: 85° C.); Brominated phenol novolak epoxy |

| | |
|---|---|
| | resin (epoxy equivalent: 280; softening point: 83° C.). |
| Curing agent: | Phenol novolak resin (hydroxyl equivalent: 106; softening point: 80° C.). |
| Curing promoter: | Triphenylphosphine. |
| Filler: | Spherical silica (BF 100, Mitsubishi Metal Corporation). |

The compositions thus obtained were molded under the conditions of 175° C. and 100 kg/cm² for 3 minutes and then postcured at 180° C. for 6 hours to give molded test specimens.

The thus-obtained semiconductor devices were each subjected to a TCT test (−50° C./5 minutes to 150° C./5 minutes) and the number of cracks was recorded. In a further crack resistance test, the test specimens mentioned above were allowed to stand in a constant-temperature bath (maintained at 85° C. and 85% RH) for moisture absorption and then immersed in a molten solder bath at 260° C. for 10 seconds. The results obtained are shown below in Table 5.

The test specimens obtained were tested for bending strength at 200° C. (high-temperature strength), glass transition temperature, thermal expansion coefficient, and moisture absorption after 500 hours of conditioning at 85° C. and 85% RH. The results obtained are shown below in Table 6.

TABLE 4

| | | | Example | | | | | | | Comparative Example |
|---|---|---|---|---|---|---|---|---|---|---|
| | | | 22 | 23 | 24 | 25 | 26 | 27 | 28 | 2 |
| Epoxy resin composition (parts by weight) | Epoxy resin | Example 15 | 63.2 | | | | | | | |
| | | Example 16 | | 63.1 | | | | | | |
| | | Example 17 | | | 63.5 | | | | | |
| | | Example 18 | | | | 68.4 | | | | |
| | | Example 19 | | | | | 60.0 | | | |
| | | Example 20 | | | | | | 60.0 | | |
| | | Example 21 | | | | | | | 66.1 | |
| | | o-Cresol novolak-based epoxy resin | | | | | | | | 60.3 |
| | | Brominated phenolic novolak-based epoxy resin | 6 | 6 | 6 | 6 | 6 | 6 | 6 | 6 |
| | Phenolic novolak resin | | 30.8 | 30.9 | 30.5 | 25.6 | 34.0 | 34.0 | 27.9 | 33.7 |
| | Triphenylphosphine | | 2 | 2 | 2 | 2 | 2 | 2 | 2 | 2 |
| | BF-100 | | 450 | 450 | 450 | 450 | 450 | 450 | 450 | 450 |
| | Other components* | | 14 | 14 | 14 | 14 | 14 | 14 | 14 | 14 |

*Antimony trioxide 6, silane coupling agent 4, wax 1, carbon black 3.

TABLE 5

| | | | Example | | | | | | | Comparative Example |
|---|---|---|---|---|---|---|---|---|---|---|
| | | | 22 | 23 | 24 | 25 | 26 | 27 | 28 | 2 |
| Number of cracks found in TCT test (cracks/5 specimens) | Number of cycles | 1000 | 0/5 | 0/5 | 0/5 | 0/5 | 0/5 | 0/5 | 0/5 | 5/5 |
| | | 2000 | 0/5 | 0/5 | 0/5 | 0/5 | 0/5 | 0/5 | 0/5 | 5/5 |
| | | 3000 | 0/5 | 0/5 | 0/5 | 0/5 | 0/5 | 0/5 | 0/5 | 5/5 |
| Number of cracks found in crack resistance test comprising immersion in molten solder (Cracks/5 specimens) | Period of treatment for moisture absorption at 85° C./85% RH | 48 Hrs | 1/5 | 0/5 | 0/5 | 0/5 | 0/5 | 0/5 | 1/5 | 5/5 |
| | | 72 Hrs | 1/5 | 0/5 | 1/5 | 0/5 | 0/5 | 1/5 | 1/5 | 5/5 |
| | | 96 Hrs | 2/5 | 1/5 | 1/5 | 1/5 | 1/5 | 1/5 | 2/5 | 5/5 |

TABLE 3

| | Example | | | | | | | Comparative Example |
|---|---|---|---|---|---|---|---|---|
| | 22 | 23 | 24 | 25 | 26 | 27 | 28 | 2 |
| Bending strength (kg/cm², 200° C.) | 5.7 | 6.5 | 4.5 | 7.0 | 7.5 | 7.5 | 9.0 | 1.1 |
| Glass transition temperature (°C.) | 240 | 260 | 250 | 230 | 270 | 270 | 260 | 164 |
| Thermal expansion coefficient ($10^{-5}$/°C.) | 1.4 | 1.4 | 1.4 | 1.4 | 1.4 | 1.4 | 1.3 | 1.6 |

TABLE 3-continued

| | Example | | | | | | | Comparative Example |
|---|---|---|---|---|---|---|---|---|
| | 22 | 23 | 24 | 25 | 26 | 27 | 28 | 2 |
| Water absorption (%) | 2.9 | 3.0 | 3.0 | 2.7 | 3.2 | 3.2 | 2.5 | 3.9 |

The poly-hydroxynaphthalene compound of the present invention, when used as a curing agent for epoxy resins or as an epoxy resin precursor, gives cured products having a high glass transition temperature, heat stability and moisture resistance and being resistant to package cracking even during soldering treatment.

The epoxy resin of the present invention as derived from the poly-hydroxynaphthalene compound gives a high transition temperature of cured products, is excellent in heat stability and moisture resistance and can prevent cracking in packages.

The epoxy resin composition of the invention which contains the poly-hydroxynaphthalene compound as a curing agent and the epoxy resin composition of the invention which contains the poly-hydroxynaphthalene compound-derived epoxy resin give a high glass transition temperature as well as excellent heat stability and high mechanical strength of semiconductor encapsulant. They show excellent moisture resistance, with low levels of water absorption, and allow only a very low frequency of cracking even in the step of soldering treatment. Therefore, they are useful as semiconductor encapsulant compositions.

The epoxy resin composition preferably comprises a curing promoter, and in that case, is especially useful as semiconductor encapsulants.

We claim:

1. An epoxy resin composition which comprises an epoxy resin and a poly-hydroxynaphthalene compound as an epoxy resin curing agent, said poly-hydroxynaphthalene compound being derived from alpha-naphthol and beta-naphthol by copolycondensation with an aldehyde, the proportions of the alpha-naphthol unit and the beta-naphthol unit being 85 to 15:15 to 85 mole percent, the amount of said aldehyde to be used being within the range of 0.3 to 0.9 mole per mole of the sum total of the alpha-naphthol and the beta-naphthol, said compound having a weight-average molecular weight of 300 to 2,000; wherein the epoxy resin is selected from the group consisting of bisphenol A resins, phenol novolak resins and cresol novolak resins, said epoxy resin has a softening point of 50° to 130° C. and an epoxy equivalent weight of 160 to 210; and wherein an equivalent ratio between the epoxy groups of said epoxy resin and the phenolic hydroxyl groups of said poly-hydroxynaphthalene compound is within the range of 1:0.8 to 1.2.

2. An epoxy resin composition for use as a semiconductor encapsulant which comprises an epoxy resin, a poly-hydroxynaphthalene compound as an epoxy resin curing agent and curing promoter, said poly-hydroxynaphthalene compound being derived from alpha-naphthol and beta-naphthol by copolycondensation with an aldehyde, the proportion of the alpha-naphthol unit and the beta-naphthol unit being 85 to 15:15 to 85 mole percent, the amount of said aldehyde to be used being within the range of 0.3 to 0.9 mole per mole of the sum total of the alpha-naphthol and the beta-naphthol, said compound having a weight-average molecular weight of 300 to 2,000; wherein the epoxy resin is selected from the group consisting of bisphenol A resins, phenol novolak resins and cresol novolak resins, said epoxy resin has a softening point of 50° to 130° C. and an epoxy equivalent weight of 160 to 210; wherein an equivalent ratio between the epoxy groups of said epoxy resin and the phenolic hydroxyl groups of said poly-hydroxynaphthalene compound is within the range of 1:0.8 to 1.2; and wherein an amount of said curing promoter is within the range of 0.1 to 3.0% by weight based on the weight of the epoxy resin composition.

* * * * *